United States Patent
Baker

[15] 3,671,844
[45] June 20, 1972

[54] DC POWER CONTROLLER WITH STATIC SWITCHING ELEMENTS AND COMMON CURRENT FEEDBACK TRANSFORMER BETWEEN DIRECT VOLTAGE SOURCE AND LOAD

[72] Inventor: Donal E. Baker, Lima, Ohio
[73] Assignee: Westinghouse Electric Corporation, Pittsburgh, Pa.
[22] Filed: Nov. 24, 1970
[21] Appl. No.: 92,348

[52] U.S. Cl. .................................................. 321/2, 321/16
[51] Int. Cl. .................................................. H02m 3/32
[58] Field of Search .................. 321/2, 16, 18; 323/17, 22 T, 323/23, 25, 38, 57, 58, 62

[56] References Cited

UNITED STATES PATENTS

| | | |
|---|---|---|
| 2,849,673 | 8/1958 | Hubbard .............................. 321/16 X |
| 3,289,067 | 11/1966 | Pinckaers .............................. 321/2 |
| 3,072,837 | 1/1963 | Hakimoglu .............................. 321/18 |
| 3,012,181 | 12/1961 | Schultz .............................. 321/2 |
| 3,074,000 | 1/1963 | Salihi .............................. 321/16 |

Primary Examiner—A. D. Pellinen
Attorney—A. T. Stratton, F. P. Lyle and G. H. Telfer

[57] ABSTRACT

Apparatus to control the application of DC power from a source to a load with static (transistor) switching elements driven by a highly efficient drive circuit. A common current feedback transformer is used to drive the switch from the DC load current. This provides base drive current that is proportional to the DC load current and is insensitive to supply voltage variations.

5 Claims, 3 Drawing Figures

PATENTED JUN 20 1972 3,671,844

DC POWER CONTROLLER WITH STATIC SWITCHING ELEMENTS AND COMMON CURRENT FEEDBACK TRANSFORMER BETWEEN DIRECT VOLTAGE SOURCE AND LOAD

BACKGROUND OF THE INVENTION

1. Field of the Invention

The invention relates to static DC power controllers for use in electrical systems.

2. Description of the Prior Art

In many applications where electromechanical switching devices have been used there is increasing interest in the use of static, semiconductor, switching devices for greater reliability, more consistent switching characteristics, and other advantages. In aircraft electrical systems, high reliability is particularly important. As opposed to thermal circuit breakers, such as are now conventionally used to control the supply of power to various loads in the system, the static switching devices will be capable of reducing the inrush current, providing sure protection of the load against damage, switching between various loads with facility and giving extremely fast tripout time for severe faults. Such capability permits greater optimization of the entire electrical system because the conditions to which the loads are subjected are fixed within narrower limits. Consequently, a net reduction in wire and generator weight can be realized.

Many transistor switching arrangements are known to the prior art. However, they are generally characterized by power hungry drive circuits, that it, the circuit portion by which the signal to the base of the transistor is provided to control what is happening in the emitter-collector current path requires undesirably large amounts of power. The present invention was a result of efforts to provide static power controllers with a drive circuit of greater efficiency, and with a low switch voltage drop as compared with that provided by the prior art.

Base drive circuitry techniques known to the prior art include free running core timed oscillators, powered by a constant current source to supply a fixed amount of base current to the power transistor. This approach is undesirable because the base drive circuitry accounts for over two-thirds of the total switch power losses. These losses in the base drive circuit are the same whether the load current is zero or full load. Also, performance is dependent on the input voltage operating range. The maximum efficiency and hold-in current are less in a unit operating at a range of from about 10 to 28 volts as compared with one operating at a range from about 20 to 28 volts, assuming both to be fully on at rated current, for the specified voltage condition.

Some of these drawbacks of the prior art could be lessened at the expense of adding some additional control circuits resulting in a more complex arrangement.

SUMMARY OF THE INVENTION

The present invention provides apparatus to control the application of DC power from a source to a load including, in combination, a pair of static switching devices, such as transistors, connected in parallel between a source of direct voltage and a load. A base drive circuit to each of the switching devices to produce alternate full conduction of the parallel connected switching devices is provided comprising a current feedback transformer whose primary circuit includes a turn in series with the main current path of each of the switching devices and whose secondary circuit includes a plurality of turns connected across the bases of the transistors with the center tap connected in common to an electrode of each switching device and the load.

The combination described in the preceding paragraph is self-sustaining in operation if the gain of the switching elements is greater than the turns ratio of the secondary to primary windings. To insure sustained operation for no-load conditions and also to provide some means of shutting off the switch, an additional winding is provided on the secondary of the transformer which is connected with means for independently controlling the starting and stopping of the base drive circuit.

As contrasted with available techniques of the prior art, the present invention provides base drive circuitry that accounts for only 10 percent to 20 percent of the total switch power losses. As the load current decreases, the base drive losses decrease almost proportionally. Base drive current levels and drive losses are essentially unaffected by supply voltage variations. Consequently, the combination of this invention satisfies a real need for an efficient transistor base drive technique that exists particularly in aircraft electrical systems where hundreds of DC power controllers are required on a single aircraft. It will be understood however that application of the invention potentially has much broader application than aircraft power controllers, as will be apparent to those skilled in the art.

DRAWING DESCRIPTION

DESCRIPTION OF THE PREFERRED EMBODIMENTS

Figure 1:
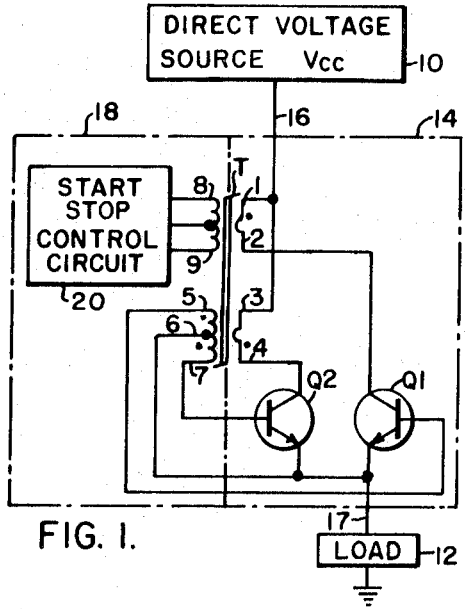
FIG. 1 is a circuit schematic of one embodiment of the present invention.

Referring to FIG. 1, an embodiment of the invention is shown. A direct voltage source 10, supplying a voltage designated $V_{cc}$, is connected to a load 12 through an arrangement 14 that includes static switching apparatus. The static switching devices are three terminal semiconductor devices, preferably transistors, designated Q1 and Q2. The transistors are connected in parallel and are connected between the source and the load by conductors 16 and 17. A transformer T has a saturable core with a primary circuit including a turn (1,2) in series with the collector-emitter path of Q1 and a turn (3,4) in series with the collector-emitter path of Q2.

A transistor base drive circuit 18 is associated with the switching arrangement 14. The base drive circuit includes the secondary circuit of the transformer T that has a plurality of turns (5,7) connected across the bases of the transistors with a center tap 6 connected in common to an electrode of each of the transistors and the load by conductor 17. In the illustrated arrangement, the transistors are connected with their collectors toward the power source 10 and their emitters connected in common to the load 17.

In operation, transistors Q1 and Q2 are alternately conductive, each having a duty cycle of 50 percent. When Q1 is on, load current passes through the single turn primary winding (1,2) of the transformer T. A secondary current is induced in a portion of the secondary winding (5,6) and has a magnitude equal to the load current divided by the turns ratio of the secondary to primary windings $N_{(5,6)}/N_{(1,2)}$. If the turns ratio is smaller than the gain (beta) of the transistor Q1, then enough base drive current will be supplied to Q1 to sustain conduction of Q1. If the turns ratio is greater than the gain of Q1, additional current may be supplied by a control circuit 20 through an additional winding (8,9) on the secondary of the transformer to insure complete saturation of Q1.

Assuming for the moment that the circuit is self-sustaining, current flow through Q1 will continue until the transformer T1 saturates. Immediately after saturation, the circuit will change states and Q2 will be driven into conduction by current from transformer winding (6,7) on the secondary.

Figure 2:
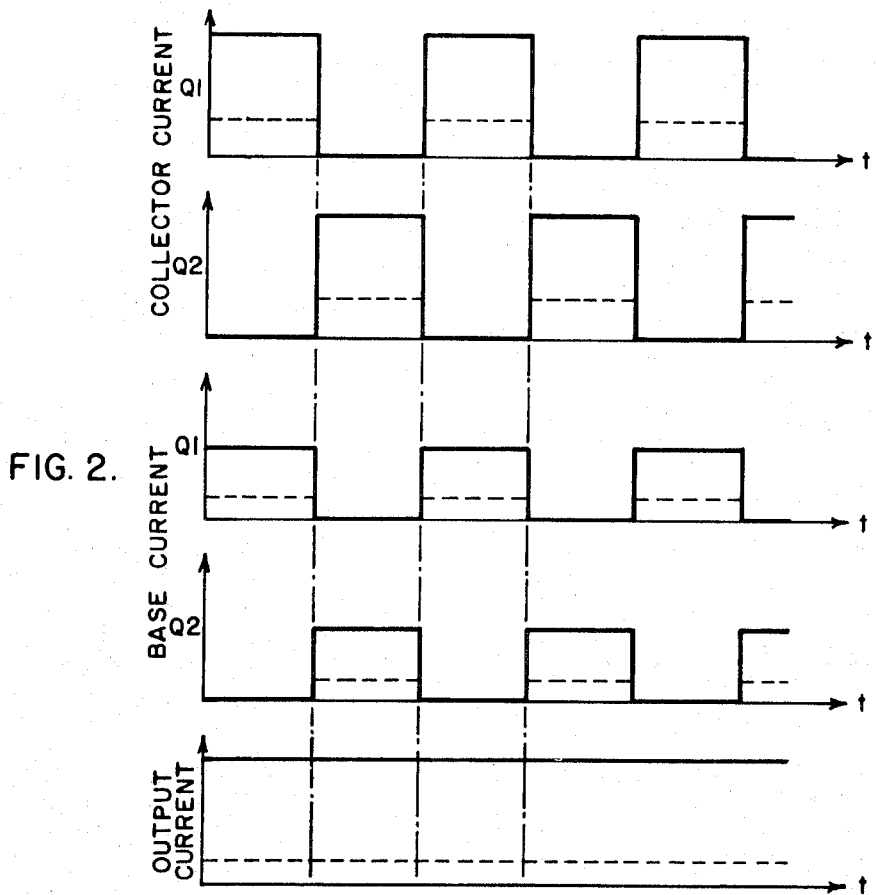
FIG. 2 is a set of waveform curves for the performance of the circuit of FIG. 1.

FIG. 2 illustrates the nature of the performance of the circuit. In each of the five curves current is plotted against time. In the uppermost curve is shown the collector current conducted through transistor Q1. The second curve shows the collector current conducted through transistor Q2 which occurs alternately with that of Q1. Similarly, the third and fourth curves show the base current provided by the current feedback transformer base drive circuit to the bases of Q1 and Q2, respectively. The fifth curve is of the cumulative output current to the load. In each of the curves, the solid line represents full load conduction while the dashed line represents part load conduction giving a quantitative indication of the decrease in drive current with reduced load.

The conduction of Q1 and Q2 each occurs until saturation of the transformer in each direction of magnetization. The circuit continues switching in this manner similar in operation to that of a core timed oscillator, such as a Royer oscillator, yet without as much power required to drive it. The base current of the transistors can be expressed as:

$$I_B = \frac{I_{Load} N_{(1,2)}}{N_{(5,6)}} \text{ or } \frac{I_{Load} N_{(3,4)}}{N_{(6,7)}}$$

and thus can be a small fraction of the load current at any value of load current.

If the turns ratio is selected to be slightly less than the worst case gain of the transistors, the switch will automatically provide the right amount of drive for any load condition independent of input voltage variations. This characteristic is desirable for fault clearing requirements. High fault currents can be passed with no increase in control circuit complexity.

The circuit, once started, will remain in conduction until the load current drops below a holding current level or is stopped by a clamping means in an independent control circuit 20 as generally shown in FIG. 1. The value of the holding current is established by losses in the transformer and gain losses in the transistors at low current levels. For the latter reason, it is necessary to supply a slight amount of energy to the system through the additional secondary winding (8,9) to sustain conduction for no load conditions. Also, since the circuit may otherwise be self-sustaining, some means of shutting off the switch must be provided.

Figure 3:
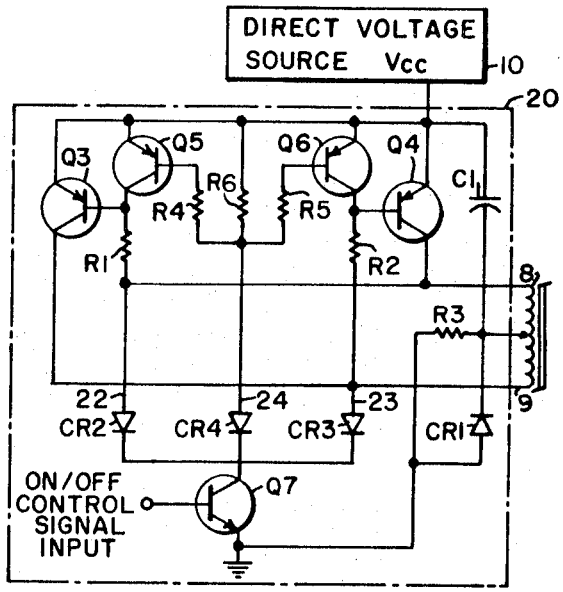
FIG. 3 is a circuit schematic of a portion of the circuit of FIG. 1.

Referring to FIG. 3, there is shown an example of a start/stop control circuit 20 that may be used in the arrangement of FIG. 1. The circuit includes four transistors Q3, Q4, Q5 and Q6 of PNP type in this example, all of which have their emitters connected to the power source 10. The collector of Q3 is connected to the base of Q4 and the collector of Q6 through resistor R2. The collector of Q4 is connected to the base of Q3 and collector of Q5 through resistor R1. The bases of Q5 and Q6 are interconnected through resistors R4 and R5 with an additional resistor R6 connected to a point between R4 and R5 and to the power source 10.

The transistors Q3, Q4, Q5 and Q6 are thus interconnected to provide three current paths 22, 23 and 24 in each of which is a diode CR2, CR3 or CR4, respectively, for unidirectional conduction to the collector of an additional transistor Q7 of NPN polarity which has its emitter grounded and whose base is accessible to apply an on/off control signal. The transformer winding (8,9) is connected across paths 22 and 23. The center tap of the winding (8,9) is connected to the grounded emitter of Q7 through the parallel combination of resistor R3 and diode CR1 and, also, through capacitor C1 to the source 10.

When there is no input signal to the base of Q7, Q7 will be off and consequently there will be no base drive to transistors Q5 and Q6 so they will also be off. Under these conditions, the combination comprising transistors Q3, Q4, R1, R2, R3, C1, and the transformer, will oscillate in the manner of a current limited Royer oscillator. The value of R3 and the number of turns in transistor winding (8,9) are selected to give a small base drive to transistors Q1 and Q2, taking into account the specified value of Vcc.

If a control signal is supplied to the base of Q7, Q7, will become saturated and consequently so will Q5 and Q6. Saturation of Q5 and Q6 disables the Royer oscillator while the diode rectifiers and Q7 provide a current path which will result in extinguishing and holding off the power switch of Q1 and Q2. The switch will remain off until the control signal to the base of Q7 is removed.

The following table is supplied for purposes of further example to identify elements that may be employed in the practice of the invention;

TABLE

| | |
|---|---|
| Transformer T1 | Magnetics Inc. Type 50056–1D |
| Transistors Q1 and Q2 | Westinghouse Type 1763–1020 or 1763–1010 |
| Vcc | 30 v. DC |
| Load resistance | 3 ohms |
| Primary windings 1, 2 and 3, 4 | 1 turn each |
| Secondary windings 5, 6 and 6, 7 | 10 turns each |
| Secondary winding 8, 9 | 120 turns total |
| Transistors Q3, Q4, Q5, Q6 | 2N 2904A |
| Transistor Q7 | 2N2102 |
| Resistors R1 and R2 | 3 kilohms, 1/2 w. |
| Resistor R3 | 510 ohms, 1w. |
| Resistors R4, R5 and R6 | 20 kilohms, 1/2 w. |
| CR1 and CR4 | 1N4003 |
| CR2 and CR3 | Westinghouse Type 388A |
| C1 | 1 Microf. 35 v. DC |

The use of the invention substantially lowers the power dissipation by reducing losses in the base drive by 80 to 90 percent at full load. For example, the circuit as described has been operated with measurable power dissipation of 0.15 watts as compared to an equivalent base drive circuit with a fixed base drive current resulting in losses of 1.2 watts. Such figures are for full load conditions. At 50 percent rated load conditions the improvement is even greater in the percentage of dissipation reduction. This is highly desirable to give maximum possible efficiency under idle conditions which such equipment is liable to be in for substantial periods.

I claim:

1. Apparatus to control the application of DC power from a supply to a load comprising: first and second static switching devices each having first, second and third electrodes; a transformer having a saturable core and a primary circuit and a secondary circuit, said primary circuit including two winding portions each having at least one turn connected between a direct voltage supply that supplies a substantially constant direct voltage and each of said first electrodes of said static switching devices, said secondary circuit including two winding portions each having a plurality of turns connected across said second and third electrodes of each said static switching devices, said second electrodes being at different positions on said secondary winding portions to obtain drive signals to alternate the condition of said static switching devices when said transformer core saturates; said transformer including an additional winding in said secondary circuit connected to means for independently controlling the switching action of said static switching devices; said third electrodes of said static switching devices being connected in common to a point between said secondary winding portions and to said load to apply a substantially constant direct voltage to said load.

2. The subject matter of claim 1 wherein: said static switching devices are transistors, and said second electrodes are the base electrodes of said transistors.

3. The subject matter of claim 1 wherein: said means for independently controlling the switching action of said transistors comprises first, second, third, and fourth like polarity transistors each having emitter, base, and collector electrodes; the emitter electrodes of each of said first, second, third, and fourth transistors being connected in common to said direct voltage supply, the collector electrode of said first transistor being directly connected to one side of said secondary winding portions and resistively connected to the base electrode of said second transistor and to the collector electrode of said third transistor; the collector electrode of said second electrode being directly connected to the other side of said secondary winding portions and resistively connected to the base electrode of said first transistor and to the collector electrode of said fourth transistor; the base electrodes of the third and fourth transistors being resistively connected together and an additional resistor is connected from the midpoint of the resistance between the base electrodes of the third and fourth transistors to the direct voltage supply; a fifth transistor having opposite polarity to said first, second, third, and fourth transistors having its collector connected respectively through three like poled diodes to each side of said secondary winding portions and to the midpoint of the resistance between the base electrodes of the third and fourth transistors; the emitter of said fifth transistor being coupled to the midpoint of said secondary winding portions; the base electrode of said fifth transistor being available for application of ON/OFF control signal inputs.

4. In an electrical power system, the combination comprising: a pair of transistors connected in parallel each with a collector-emitter path connected between a source of direct voltage and a load; a base drive circuit connected to the base of each of said transistors to produce alternate full conduction between said source and said load through said two transistors, said base drive circuit comprising a current feedback transformer whose primary circuit consists of a single turn in series with the collector-emitter path of each of said transistors and whose secondary circuit includes a plurality of turns connected across the bases of said transistors with a center tap connected in common to an electrode of each of said transistors and said load.

5. The subject matter of claim 4, further comprising an additional winding in the secondary circuit of said transformer and means connected with said additional winding for independently controlling the starting and stopping of said base drive circuit.

* * * * *